(12) United States Patent
Geiger et al.

(10) Patent No.: US 11,001,298 B2
(45) Date of Patent: May 11, 2021

(54) SPHERICAL WHEEL DRIVE AND MOUNTING

(71) Applicant: Intuitive Surgical Operations, Inc., Sunnyvale, CA (US)

(72) Inventors: Stefan Geiger, Union City, CA (US); Joseph Carbone, San Jose, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 246 days.

(21) Appl. No.: 16/191,301

(22) Filed: Nov. 14, 2018

(65) Prior Publication Data

US 2019/0144036 A1 May 16, 2019

Related U.S. Application Data

(60) Provisional application No. 62/586,422, filed on Nov. 15, 2017.

(51) Int. Cl.
*B60B 19/14* (2006.01)
*B62D 11/04* (2006.01)
*B62D 11/00* (2006.01)
*B62D 15/00* (2006.01)
*B60B 33/08* (2006.01)
*B60B 19/00* (2006.01)
*B60K 7/00* (2006.01)

(52) U.S. Cl.
CPC .............. *B62D 11/04* (2013.01); *B60B 19/14* (2013.01); *B62D 11/003* (2013.01); *B62D 15/00* (2013.01); *B60B 19/003* (2013.01); *B60B 33/08* (2013.01); *B60K 2007/003* (2013.01)

(58) Field of Classification Search
CPC ..... B62D 11/04; B62D 11/183; B62D 11/003; B60B 19/003; B60B 19/14; B60K 2007/003
USPC ...................... 301/5.23; 180/7.1, 21
See application file for complete search history.

(56) References Cited

U.S. PATENT DOCUMENTS

| 2,687,546 | A | | 8/1954 | Jess et al. |
| 4,203,177 | A | | 5/1980 | Kegg et al. |
| 4,402,108 | A | * | 9/1983 | Pannwitz ................ B60B 33/08 16/26 |
| 4,413,693 | A | * | 11/1983 | Derby .................... A61G 5/043 180/21 |
| 5,057,728 | A | | 10/1991 | Dammeyer et al. |

(Continued)

OTHER PUBLICATIONS

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

*Primary Examiner* — Ruth Ilan
*Assistant Examiner* — Hosam Shabara
(74) *Attorney, Agent, or Firm* — IP Spring (57) ABSTRACT

Implementations relate to a spherical wheel drive and mounting. In some implementations, a wheel mechanism includes a spherical wheel, a base, and a rotary bearing coupled to the base and contacting a surface of the spherical wheel, where the rotary bearing configured to allow the spherical wheel to rotate. The wheel mechanism includes an omni wheel coupled to the base and engaged with a surface of the spherical wheel, and an actuator coupled to the base and to the omni wheel, where the actuator configured to rotate the omni wheel to cause rotation of the spherical wheel.

20 Claims, 7 Drawing Sheets

(56) References Cited

U.S. PATENT DOCUMENTS

| | | | |
|---|---|---|---|
| 5,906,247 A | 5/1999 | Inoue | |
| 5,950,749 A | 9/1999 | Inoue | |
| 6,888,333 B2 | 5/2005 | Laby et al. | |
| 7,578,028 B2 | 8/2009 | Sellars | |
| 7,847,504 B2 | 12/2010 | Hollis et al. | |
| 8,453,811 B2 | 6/2013 | Lewis et al. | |
| 8,459,383 B1 | 6/2013 | Burget et al. | |
| 8,827,879 B2 | 9/2014 | Nicholas | |
| 9,174,338 B2 * | 11/2015 | Ouellet | B25J 17/0275 |
| 9,199,117 B1 * | 12/2015 | Nicholas | A63B 23/03541 |
| 9,211,015 B2 | 12/2015 | Larzelere | |
| 9,427,649 B2 * | 8/2016 | Teevens | A63B 69/345 |
| 9,783,001 B1 | 10/2017 | Panter | |
| 10,099,512 B2 | 10/2018 | Hsieh et al. | |
| 10,668,771 B2 | 6/2020 | Cherian et al. | |
| 2006/0131110 A1 | 6/2006 | Chung | |
| 2008/0167160 A1 * | 7/2008 | Koike | B60K 7/00 476/33 |
| 2008/0283311 A1 * | 11/2008 | Li | B62D 37/00 180/65.1 |
| 2010/0243342 A1 | 9/2010 | Wu et al. | |
| 2013/0257138 A1 | 10/2013 | Chang et al. | |
| 2016/0333953 A1 | 11/2016 | Lewis et al. | |
| 2017/0354468 A1 | 12/2017 | Johnson et al. | |
| 2018/0022197 A1 | 1/2018 | Bewley et al. | |
| 2018/0093863 A1 * | 4/2018 | Hawkins | B66B 7/023 |
| 2018/0319215 A1 * | 11/2018 | Sharp | B60B 33/045 |
| 2019/0145471 A1 | 5/2019 | Carbone et al. | |

\* cited by examiner

SPHERICAL WHEEL DRIVE AND MOUNTING

CROSS-REFERENCE TO RELATED APPLICATIONS

The present application claims priority to U.S. Provisional Patent Application No. 62/586,422, filed Nov. 15, 2017 and titled "Spherical Wheel Drive and Mounting," the entire contents of which are hereby incorporated by reference.

BACKGROUND

Wheel systems use wheels to contact the ground and support a load, where the wheel systems can be used to move large loads more easily across ground surfaces and to particular physical locations. Some wheel systems are wheel drive systems that can drive the wheels with motors to move the load under motorized and/or user control. In some examples, casters can be provided on the bottom of an object or a cart supporting a load, where the wheels of the caster allow the object to be rolled over the ground and can be driven by motors connected to the wheels.

Some wheel drive systems may use a spherical wheel that can roll in multiple directions. In some of these systems, one motor-driven roller is positioned to contact a surface of a spherical wheel to drive the spherical wheel in a first direction, and another motor-driven roller contacts the spherical wheel at a different location of the spherical wheel to drive the spherical wheel in a different direction, e.g., perpendicular to the first direction. Each of the rollers may be an "omni wheel" having smaller rollers contacting the spherical wheel and allowing the spherical wheel to rotate in directions other than the driven direction of the omni wheel.

Some wheel systems are desired to be highly stable so that the load carried by the wheel system is not allowed to have accidental or unintended motion, e.g., when the load is being moved and/or when the load is stationary after it has been moved into a particular location. One example of such a load is a slave device used in a teleoperated surgical system, which is used to provide teleoperated surgery on a patient. A surgeon typically operates a master controller to remotely control (e.g., telemanipulate) the motion and functions of surgical instruments in the slave device at the surgical site. Teleoperated slave devices that include the surgical instruments can be moved to a location near a patient in an operating room using a wheel system and held stationary at that location during a medical procedure.

Some wheel systems may allow unintended motion of the carried load. For example, casters, spherical wheels, and other wheel systems typically have backlash and play in the components of the wheel mechanisms, which allows the carried load to vibrate, wobble, or otherwise move in small amounts even when the wheel system is held stationary at a location. For example, casters typically can swivel, and the components allowing this motion may allow the carried load to sway or be nudged unintentionally when moved or when stationary. Spherical wheel systems may cause vibration in their loads when moved due to a cogging effect of multiple small rollers of an omni wheel successively contacting the surface of the spherical wheel as the omni wheel rotates. Furthermore, omni wheels typically include backlash and play in the small rollers of the omni wheel, thus causing backlash in the contact path from the omni wheel to the spherical wheel and causing instability in the load during movement or when stationary.

Such unintended motion in the load of a wheel system can be harmful and dangerous, e.g., if the load is a medical device that depends on stability during medical procedures in which contact is made with a patient, such as teleoperated surgical devices. Providing additional stability mechanisms in such wheel systems, such as adding retractable feet at a stationary position, adds to the cost of the wheel systems and devices.

SUMMARY

Implementations of the present application relate to a spherical wheel drive and mounting. In some implementations, a wheel mechanism includes a spherical wheel, a base, and a rotary bearing coupled to the base and contacting a surface of the spherical wheel. The wheel mechanism includes an omni wheel coupled to the base and engaged with a surface of the spherical wheel, and an actuator coupled to the base and to the omni wheel, where the actuator configured to rotate the omni wheel to cause rotation of the spherical wheel.

Various implementations and examples of the wheel mechanism are described. For example, in some implementations, the rotary bearing is configured to allow the spherical wheel to rotate. In some implementations, the spherical wheel is rotatable in any direction. In some implementations, the rotary bearing includes a ball transfer unit including a spherical ball contacting the surface of the spherical wheel, where the spherical ball allows the spherical wheel to rotate in any direction. In some implementations, the rotary bearing is one of a plurality of rotary bearings, where the rotary bearings are coupled to the base and contact the surface of the spherical wheel. In some implementations, the plurality of rotary bearings are configured to allow the spherical wheel to rotate. In some examples, the rotary bearings are each configured to provide a direct path for a majority portion of weight of a load carried by the wheeled mechanism directly to the spherical wheel. In additional examples, the rotary bearings are spaced approximately equally around the spherical wheel.

In some implementations having a plurality of rotary bearings, a first rotary bearing contacts the surface of the spherical wheel at a first position to oppose a force applied by the omni wheel against the spherical wheel, and a second rotary bearing contacts the surface of the spherical wheel at a second position closer to the base than the first position at which the first rotary bearing contacts the surface of the spherical wheel. In further examples, the omni wheel is moveable, and a spring element coupled between the omni wheel and the base provides a force on the omni wheel that biases the omni wheel against the surface of the spherical wheel and isolates vibrations caused by the rotation of the omni wheel against the surface of the spherical wheel. For example, the omni wheel is rotatably coupled to a pivoting member, where the pivoting member is rotatably coupled to the base, and a spring element is coupled between the pivoting member and the base that biases the omni wheel against the surface of the spherical wheel.

In some implementations, the omni wheel is one of a plurality of omni wheels coupled to the base and engaged with the surface of the spherical wheel, where a respective rotary bearing engages the spherical wheel in a position to oppose a respective force applied by an associated omni wheel against the surface of the spherical wheel. For example, each of the omni wheels is rotatably coupled to a respective pivoting member, where each respective pivoting member is rotatably coupled to the base, and a respective spring element is coupled between each respective pivoting member and the base that biases the respective omni wheel against the surface of the spherical wheel.

In some implementations, a wheel system includes a chassis and a plurality of wheel modules coupled to the chassis, where one or more wheel modules of the plurality of wheel modules are spherical wheel modules that include a spherical wheel; a base coupled to the spherical wheel via a rotary bearing that contacts a surface of the spherical wheel; an omni wheel coupled to the base and engaged with the surface of the spherical wheel; and an actuator coupled to the base and to the omni wheel and configured to apply rotational force to the omni wheel to cause rotation of the spherical wheel.

Various implementations and examples of the wheel system are described. In some implementations, the plurality of wheel modules are three wheel modules. In some implementations, each spherical wheel module is caused to rotate an associated spherical wheel in a different direction with respect to other spherical wheel modules, where the rotation is caused by a respective actuator associated with each of the spherical wheel modules.

In additional examples, the rotary bearing in the wheel module is configured to allow the spherical wheel to rotate. In some implementations, in each of the spherical wheel modules, the rotary bearing is one of a plurality of ball transfer units that each transmit a portion of a load carried by the wheeled system directly to the spherical wheel, where the plurality of ball transfer units are coupled to the base and contact the surface of the spherical wheel, and the plurality of ball transfer units are configured to allow the spherical wheel to rotate. In additional examples, in each of the spherical wheel modules, a first rotary bearing of the plurality of rotary bearings contacts the surface of the spherical wheel at a first position to oppose a force applied by the omni wheel against the spherical wheel, and a second rotary bearing of the plurality of rotary bearings contacts the surface of the spherical wheel at a second position closer to the base than the first position at which the first rotary bearing contacts the surface of the spherical wheel. In additional examples, in each of the spherical wheel modules, the omni wheel is one of a plurality of omni wheels coupled to the base and engaged with the surface of the spherical wheel, where a respective rotary bearing engages the spherical wheel in a position to oppose a respective force applied by each omni wheel against the surface of the spherical wheel.

In some implementations, a method to control a wheel mechanism includes constraining a spherical wheel in a rotating space relative to a base, where the spherical wheel is constrained by a plurality of rotary bearings that are coupled to the base and engaged with a surface of the spherical wheel, and the rotary bearings allow the spherical wheel to rotate in any direction. The method includes biasing an omni wheel against the spherical wheel, where the omni wheel is coupled to the base. The method includes controlling an actuator to rotate the omni wheel, where the rotation of the omni wheel causes the spherical wheel to rotate within the rotating space.

Various implementations and examples of the method are described. For example, in some implementations, the omni wheel is biased against the spherical wheel with a spring force provided between the omni wheel and the base, where the spring element isolates vibrations caused by the rotation of the omni wheel against the surface of the spherical wheel. In some implementations, the wheel mechanism includes a plurality of wheel modules, where the spherical wheel and the actuator are a first spherical wheel and a first actuator included in a first wheel module of the plurality of wheel modules, and a second spherical wheel and a second actuator are included in a second wheel module of the plurality of wheel modules, and the method further includes controlling the second actuator to rotate a second omni wheel coupled to the base and engaged with the surface of the second spherical wheel. The rotation of the second omni wheel causes the second spherical wheel to rotate in a second direction different than a first direction in which the first spherical wheel is caused to rotated by controlling the first actuator.

DETAILED DESCRIPTION

Implementations relate to a spherical wheel drive and mounting. As described in more detail herein, implementations of a spherical wheel mechanism can include a spherical wheel that is contacted by rotary bearings, e.g., ball transfer units, that are connected to a base that carries a load above the spherical wheel. The rotary bearings allow the spherical wheel to rotate, e.g., in any direction. An omni wheel engages the surface of the spherical wheel, where the omni wheel is rotated by a motor and the omni wheel drives the spherical wheel in a driven direction.

Described features of the wheel mechanism include a omni wheel that is moveable, e.g., pivotable with respect to the base, and a spring element coupled between the omni wheel and base provides bias that forces the omni wheel against the surface of the spherical wheel. A first rotary bearing contacts the surface of the spherical wheel at a first position to oppose a force applied by the omni wheel against the spherical wheel. A second rotary bearing contacts the surface of the spherical wheel at a different position that is closer to the base than the first position. In some implementations, the wheel mechanism can include multiple omni wheels, e.g., two omni wheels that drive the spherical wheel in two perpendicular drive directions. A wheel system can include multiple spherical wheel modules to support a chassis and load, where each such module includes a spherical wheel mechanism as described.

The spherical wheel drive and mounting features described herein provide various benefits. For example, rotary bearings such as ball transfer units contact the surface of the spherical wheel at positions to constrain the spherical wheel to a rotating position at which the omni wheel can engage the spherical wheel. In addition, a rotary bearing may be positioned to contact the spherical wheel at a position closer to the ground (further from the base) in opposition to the omni wheel that is biased against the spherical wheel. This opposing position allows a high preload to be provided by the omni wheel on the spherical wheel, thus allowing a stronger omni wheel engagement with the spherical wheel, without affecting the position of the spherical wheel in its rotating position.

Furthermore, the rotary bearings provide a direct path for the force of the load carried by the wheel mechanism to the spherical wheel, such that the omni wheel and drive mechanism need not carry a significant portion of the load. This reduces the backlash in the load paths since the play in the omni wheels does not significantly affect the load. The spring-loaded bias of the omni wheel against the spherical wheel maintains contact between the omni wheel and spherical wheel. Furthermore, the bias spring isolates vibrations resulting from omni wheel roller cogging on the surface of the spherical wheel, thus reducing vibrations in the load.

Various terms including "linear," "center," "parallel," "perpendicular," "aligned," or particular measurements or other units as used herein can be approximate, need not be exact, and can include typical engineering tolerances.

Figure 1:
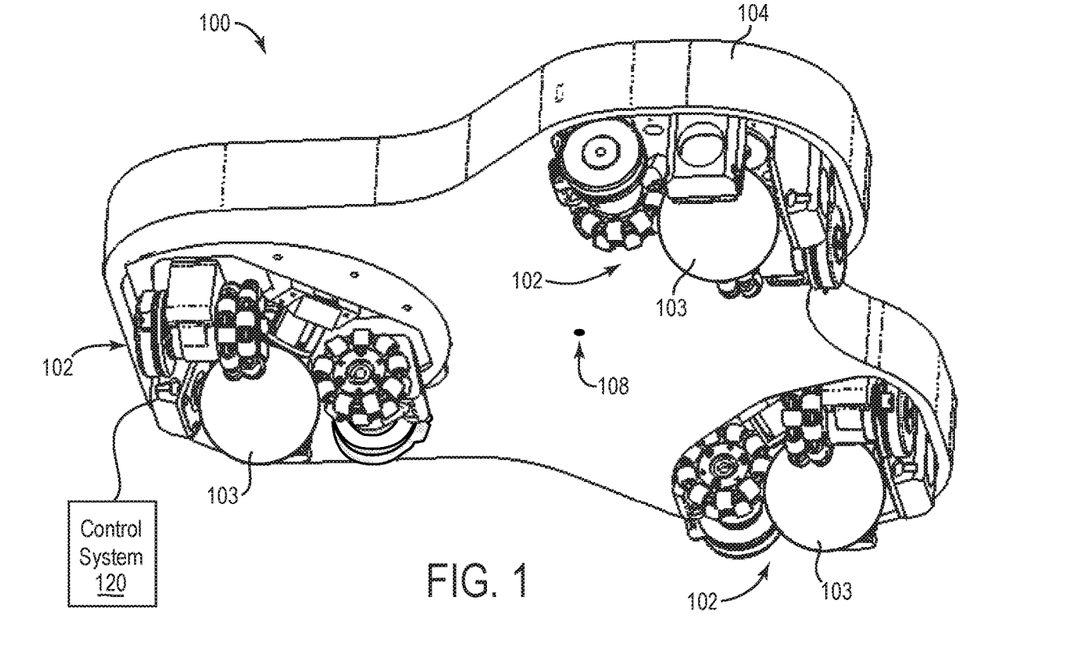
FIG. 1 is a bottom perspective view of an example wheel drive system, according to some implementations.
Figure 2:
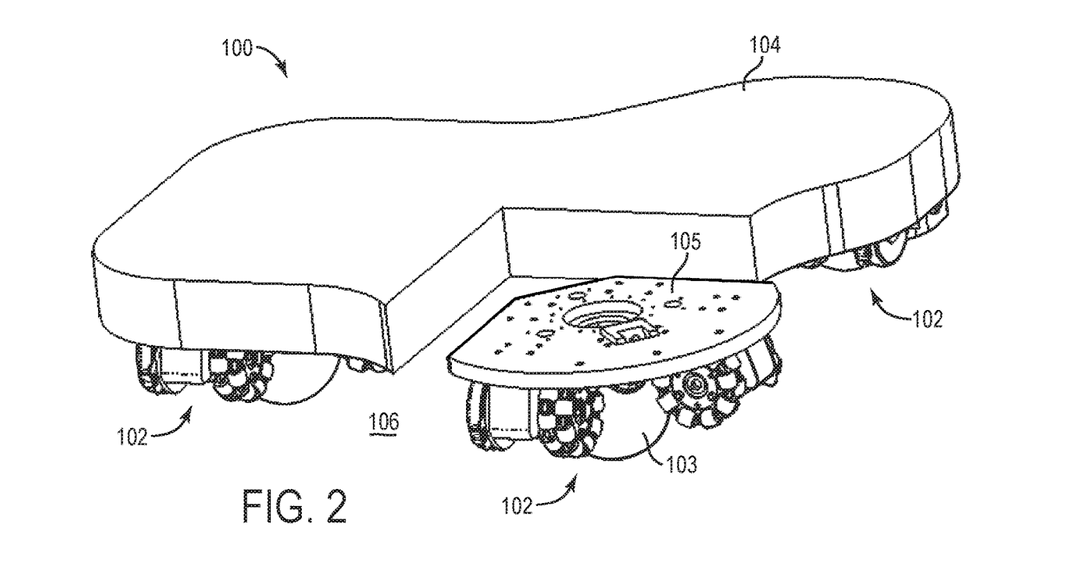
FIG. 2 is a top perspective view of the example wheel drive system of FIG. 1, according to some implementations.

FIG. 1 is a bottom perspective view of an example wheel drive system 100 from below the wheel drive system 100, according to some implementations. FIG. 2 is a top perspective view of the wheel drive system 100 from above portions of the wheel drive system 100.

Wheel drive system 100 includes multiple wheel modules 102 that are positioned under a chassis 104, which can also be referred to as a frame or load object herein. In this example, the wheel modules 102 are positioned under and support the chassis 104. The wheel modules 102 each include a spherical wheel 103 that contacts the ground 106 (see FIG. 2) and supports the chassis 104. A spherical wheel 103 is operative to rotate within its associated wheel module 102 while bearing the chassis 104. This allows the wheel modules 102 to be rolled across the ground 106 while bearing chassis 104, thus allowing the wheel drive system 100 to be moved.

As shown in FIG. 2, in some implementations each wheel module 102 can be coupled to its own base 105 that supports the components of that wheel module 102. Base 105 is coupled to the bottom surface of the chassis 104. In other implementations, each wheel module 102 can be coupled directly to the bottom surface of chassis 104 or other object.

In various examples, the chassis 104 can be part of, or can carry, one or more objects. In some example implementations, the chassis 104 can be part of a medical device that can perform medical operations, and which can be rolled on the ground using wheel modules 102 to a location in which it is used to perform a medical procedure. For example, chassis 104 can be a teleoperated slave surgical device that includes surgical instruments that operate on a patient or simulated surgical site. Other objects or equipment can alternatively be carried by or included in the chassis 104. In some implementations, the chassis 104 is a cart, e.g., a structure that can bear a load object such as a medical device or other object. For example, chassis 104 can be a flat cart, a container, a basket, or other structure can be provided which can contain or hold a load of one or more additional load objects.

One or more of the wheel modules 102 can be controlled to drive its spherical wheel 103 in one or more directions based on a drive mechanism of the wheel module 102. For example, in some implementations, a spherical wheel 103 can be driven by an omni wheel that is driven by a motor. In various implementations, one or more omni wheels can drive a particular spherical wheel 103. Some examples of drive mechanisms are described below with respect to FIGS. 4-7.

In the example of FIG. 1, three wheel modules 102 are coupled to the bottom of the chassis 104. The use of three wheel modules 102 ensures that all of the spherical wheels 103 of the wheel modules 102 contact the ground 106. In some examples, the wheel modules 102 can be spaced equally (or approximately equally) from each other around a center control point 108 of the wheel drive system 100 and approximately within a plane.

In some examples, the wheel drive system 100 can be driven in any direction along the ground 106. For example, each wheel module 102 can be driven in a different particular direction, and a combination of driven motion directions from multiple of the wheel modules 102 can be controlled to drive the wheel drive system and chassis 104 in any desired direction. Some examples of controlling the motion and direction of the wheel drive system 100 are described below with respect to FIG. 3.

In other implementations, a different number of wheel modules can be used, e.g., four, five, etc., which can be similarly spaced equally about the center control point 108. In some implementations, the wheel modules 102 can be positioned at midpoints or corners of sides of a bottom surface of chassis 104. In some implementations, one or more of the wheel modules 102 can be irregularly spaced around the control point 108, e.g., at particular positions along the sides of a bottom surface of chassis 104.

A control system 120 can be included in wheel drive system 100 in some implementations to provide control signals to motors of the drive system 100 to control a speed and direction of the driven motion of the drive system 100. Control system 120 is in communication with the wheel modules 102. In various implementations, the control system 120 can be located on a component of the wheel drive system 100 (e.g., on the chassis 104, or on one or more wheel modules 102), or can be located separate from the wheel drive system 100 and communicate with the drive system 100, e.g., via wired or wireless signals. In some examples, control system 120 can include processing circuitry (e.g., a microprocessor or other circuit) and be responsive to input commands from a user, which can be input via an input device such as buttons, a keyboard, joystick, etc. to command a direction of motion of the drive system 100.

In some implementations, some of the wheel modules 102 in the wheel drive system 100 are actively driven by motors, while one or more other wheel modules 102 are passive and do not actively drive their spherical wheels. In some implementations, a subset of the wheel modules 102 in the wheel drive system 100 are wheel modules having a spherical wheel, and the other modules 102 can be different types of roller systems, e.g., casters that are actively driven with motors or passively roll without being driven by motors. In some example implementations, at least three wheel modules are provided, with at least one wheel module being a spherical wheel module with an actuator as described herein and other wheel modules each including a passive wheel that is not driven by an actuator.

Figure 3:
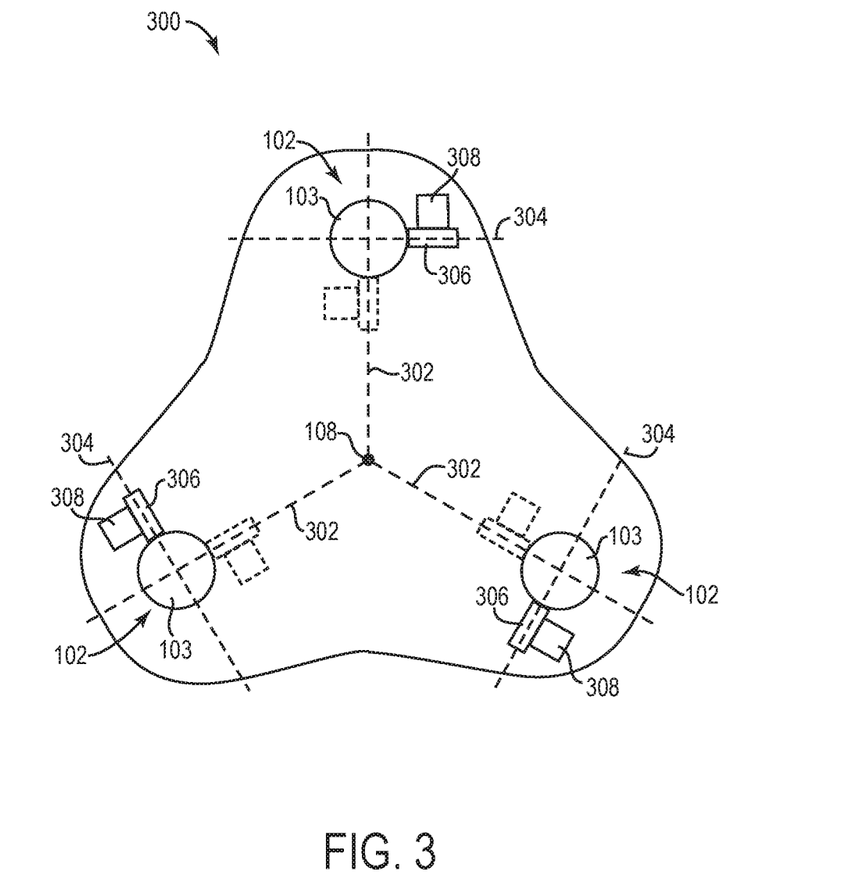
FIG. 3 is a diagrammatic illustration of wheel modules of a wheel drive system in an example configuration, according to some implementations.

FIG. 3 is a diagrammatic illustration of wheel modules 102 of a wheel drive system 100 of FIG. 1 in an example configuration to provide controlled motion of the wheel drive system, according to some implementations. Wheel modules 102 are directly coupled to one or more bottom surfaces of chassis 104.

Three wheel modules 102 are spaced regularly around the control point 108. An axis 302 extends from the control point 108 through a center of each of the spherical wheels 103 of the wheel modules 102. For example, each wheel module 102 can be spaced equally about control point 108, e.g., about 120 degrees from each of the other two wheel modules 102 in an angular measurement around control point 108, from one axis 302 to the next adjacent axis 302. In other implementations, different spacings between the wheel modules 102 can be used, e.g., where two of the wheel modules 102 are closer to each other than to the third wheel module 102. The contact points of the spherical wheels of the wheel modules 102 with the ground form a single plane. In some implementations, the wheel modules 102 are coupled to a chassis bottom surface that approximately defines a single plane.

In this example, each wheel module 102 can be driven by a motor in a particular driven direction along a respective axis 304, where each driven axis 304 of a spherical module 102 is perpendicular to the associated axis 302 extending from the control point 108 to that spherical module 102. For example, a particular spherical wheel 103 can be driven along its driven axis 304 in either direction (e.g., a driven direction) by an associated omni wheel 306 that contacts that spherical wheel 103 and is driven by an associated motor 308 (or other type of actuator). Each driven axis 304 extends in a different direction from the other driven axes 304.

In some examples, the wheel drive system 100 can be rotated about a point, e.g., control point 108, by controlling the motors 308 driving the spherical wheels 103. For example, all of the motors 308 can be controlled to output the same force to rotate the associated omni wheels by the same rate of rotation, e.g., to obtain a rotation about control point 108. In further examples, the wheel drive system 100 can be translated in a particular direction by controlling the motors 308 with different amounts of force to sum to a movement vector in the desired direction. Rotation and translation of the system 100 can be directed by controlling the output forces of the motors 308 in appropriate amounts to sum to the desired motion vector. For example, in the configuration of FIG. 3, the motor 308 at the top of FIG. 3 can be controlled to output a force to cause the wheel drive system 100 to move in the horizontal direction while modulating the force provided by the other motors 308 to prevent rotation of the system.

In some implementations, multiple omni wheels 306 and motors 308 can be associated with each of one or more of the spherical wheels 103. For example, two omni wheels 306 can be positioned to contact an associated spherical wheel 103 such that their axes of rotation are perpendicular to each other. The motors of these omni wheels can be controlled to drive a single spherical wheel 103 in two different directions. The two motors can be controlled simultaneously to drive the associated spherical wheel 103 in a direction resulting from a combination of the two different directions provided by the omni wheels. In some examples, each spherical wheel 103 can be driven by two omni wheels associated with that spherical wheel. In other examples, one or more of the spherical wheels 103 can each be driven by two associated omni wheels, and one or more other spherical wheels 103 can be driven by a single associated omni wheel, etc.

Figure 4:
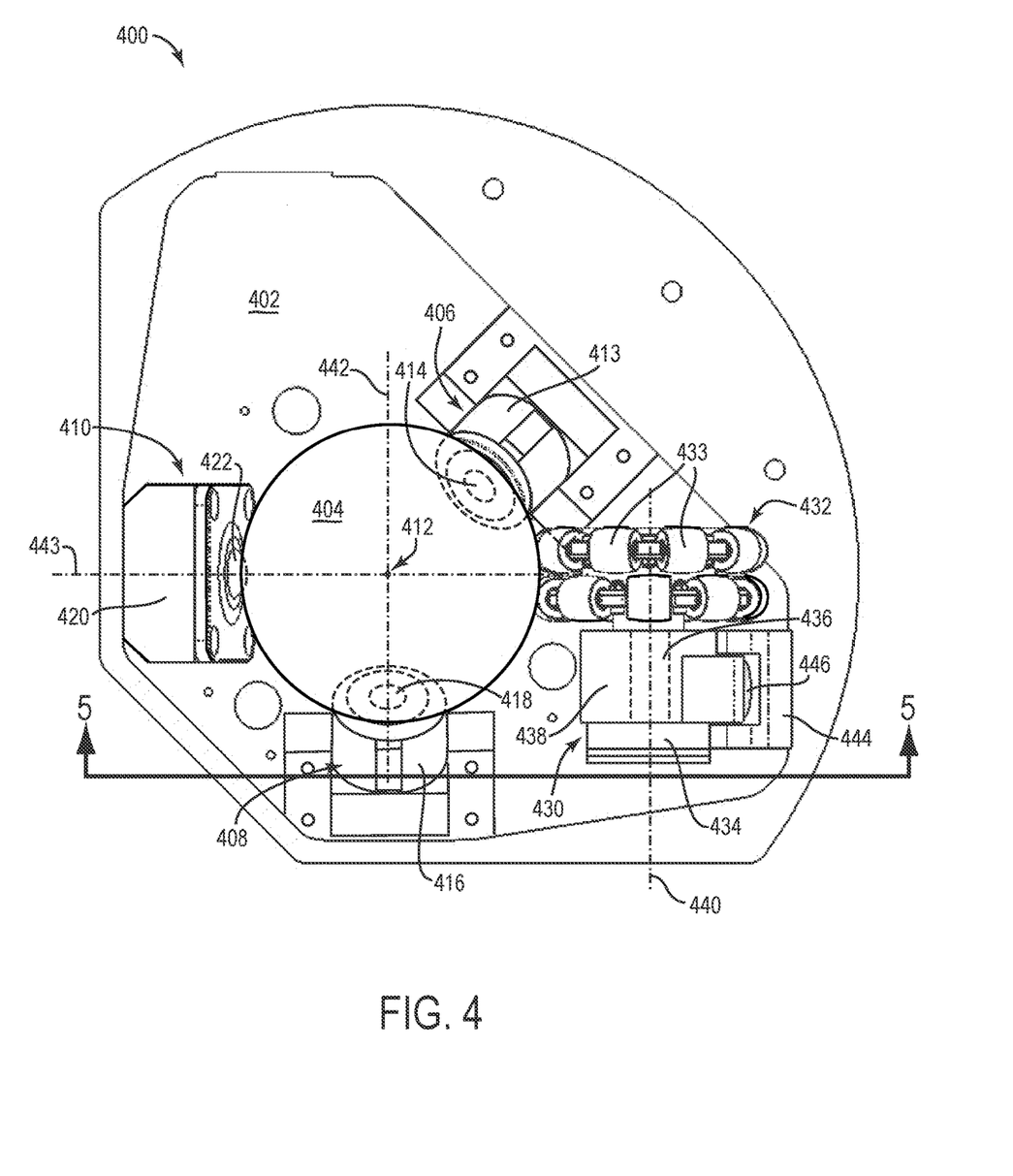
FIG. 4 is a bottom view of an example wheel module, according to some implementations.

FIG. 4 is a bottom view of an example wheel module 400, according to some implementations. For example, wheel module 400 can be one or more wheel modules 102 of FIGS. 1 and 2. In this example, one omni wheel is used to drive rotation of the spherical wheel.

Wheel module 400 includes a base 402 (e.g., chassis), which can be a plate or other support in this example. In some implementations, the base 402 is the bottom surface of chassis 104, e.g., a load object or cart as described with respect to FIG. 1. In some implementations, base 402 is a support distinct from the bottom of chassis 104.

A spherical wheel 404 is positioned in a space near to the base 402 and not in contact with the base 402. The spherical wheel 404 can be the same or similar to the spherical wheels 103 described above for FIG. 1. Spherical wheel 404 can have a surface that is at least partially compliant or flexible, e.g., to allow traction with the omni wheel that contacts the surface of the spherical wheel. In some examples, spherical wheel 404 can be made of a polyurethane material, or can be made of a rigid material (e.g., steel) and covered in a more compliant coating, e.g., a urethane coating.

Wheel module 400 includes rotary bearings provided between the base 402 and the spherical wheel 404, where the rotary bearings constrain the spherical wheel 404 to roll within a rotating space (rolling space) defined by the rotary bearings and omni wheel. In addition, the rotary bearings provide a path for the weight of a load carried by base 402 directly to the spherical wheel 404, e.g., the rotary bearings transfer most of the weight of the carried load from the base 402 to the spherical wheel 404.

In described implementations, the rotary bearings are ball transfer units 406, 408, and 410 that are directly coupled to base 402 and contact the surface of spherical wheel 404. Ball transfer unit 406 includes a restraining fixture 413 and a spherical ball 414, ball transfer unit 408 includes a restraining fixture 416 and a spherical ball 418, and ball transfer unit 410 includes a restraining fixture 420 and a spherical ball 422.

The ball transfer units 406, 408, and 410 are positioned at least partially over the spherical wheel 404, e.g., where the spherical balls 414, 418, and 422 contact the surface of the spherical wheel 404 on the base 402 side of an axis 443 that extends through the center of the spherical wheel 404 (e.g., see FIG. 4). For example, axis 443 can be parallel to the base 402 and ground surface on which the spherical wheel 404 rests. Gravity thus forces the ball transfer units in contact with the surface of the spherical wheel 404.

Each spherical ball 414, 418, and 422 contacts the surface of the spherical wheel 404 and transfers a portion of the load carried by the base 402 to the spherical wheel 404. Each spherical ball 414, 418, and 422 can be rolled omni-directionally within its restraining fixture with respect to the restraining fixture and the base 402. In some examples, each spherical ball 414, 418, and 422 can contact multiple ball bearings held within its restraining fixture to allow the omni-directional ball travel. The omni-directional travel of each spherical ball 414, 418, and 422 allow the spherical wheel 404 contacting the balls to be rotated in any direction without constraint from the ball transfer units 406, 408, and 410.

In some implementations, ball transfer units 406, 408, and 410 are spaced around the spherical wheel 404 approximately equally about a vertical axis 412 extending through a center of the spherical wheel 404 perpendicular to a ground surface or a plane of the bottom surface of the base 402. In some implementations, one or more of the ball transfer units 406, 408, and 410 can be adjusted in its position to allow space for other components, e.g., drive mechanism 430 (described below).

Ball transfer units 406, 408, and 410 can be positioned at different heights and/or angles with respect to the spherical wheel 404, e.g., such that their spherical balls contact the spherical wheel 404 at different distances from the base 402 (and/or from the ground surface 106 which the spherical wheel 404 contacts opposite to the base 402). In this example, ball transfer units 406 and 408 are positioned such that their spherical balls 414 and 418 contact the surface of the spherical wheel 404 at positions closer to the base 402 than the position at which spherical ball 422 of ball transfer unit 410 contacts the spherical wheel 404. This is described in greater detail below with respect to FIG. 5.

A drive mechanism 430 is coupled to the base 402 and includes a omni wheel 432 that is connected to a motor 434. In this example, the omni wheel 432 contacts the surface of the spherical wheel 404 and is connected to a driven rotatable shaft 436 that is connected to the rotating shaft of the motor 434. Shaft 436 is rotatably coupled to a pivoting member 438 that is rotatably coupled to the base 402.

Omni wheel 432 contacts the spherical wheel 404 as shown. Omni wheel 432 is an omni wheel that, as referred to herein, includes a main wheel and multiple circumferential rollers (e.g., rollers 433) or discs that are positioned around the circumference of the main wheel, where the circumferential rollers each rotate about an individual axis of rotation that is approximately tangential to the main wheel and perpendicular to the axis of rotation of the main wheel (where the axis of rotation of the main wheel is considered the axis of rotation of the omni wheel). The circumferential rollers are allowed to freely rotate about their individual axes. In other implementations, other types of wheels with individual or circumferential rollers can be used, e.g., Mecanum wheels.

Omni wheel 432 rotates about axis 440 that extends parallel to the surface of base 402 and/or to the ground surface. When omni wheel 432 is driven about axis 440, it rotates spherical wheel 404 about an axis 442 extending through the center of the spherical wheel 404 and parallel to axis 440 and/or to the ground surface. This provides a movement component to the wheel module 400 along axis 443 that is perpendicular to the axes 440 and 442, and provides this movement to the chassis and load carried by the wheel drive system of which wheel module 400 is a part. When spherical wheel 404 is rotated in a different direction than about axis 442 (e.g., by a different drive module of the connected wheel drive system), the freely-rotating circumferential rollers of the omni wheel 432 permit this movement of the spherical wheel 404 with respect to the omni wheel 432.

Omni wheel 432 can be biased against the surface of spherical wheel 404 by a spring force or other type of force. In this example implementation, pivoting member 438 that supports the omni wheel 432 is rotatably coupled to a support member 444 that is rigidly coupled to the base 402. A spring 446 is coupled between the support member 444 and the pivoting member 438 and is in compression to provide a spring bias of the omni wheel 432 against the surface of the spherical wheel 404. This bias provides greater traction between omni wheel 432 and spherical wheel 404, and reduces slippage between these components when rotating the omni wheel 432 using motor 434. Furthermore, the spring 446 isolates from the load (e.g., absorbs) vibrations that may be produced from cogging of the omni wheel 432 on the surface of the spherical wheel 404, caused by the uneven and irregular surfaces of the individual rollers of the omni wheel 432 rotating against the surface of the spherical wheel 404.

Figure 5:
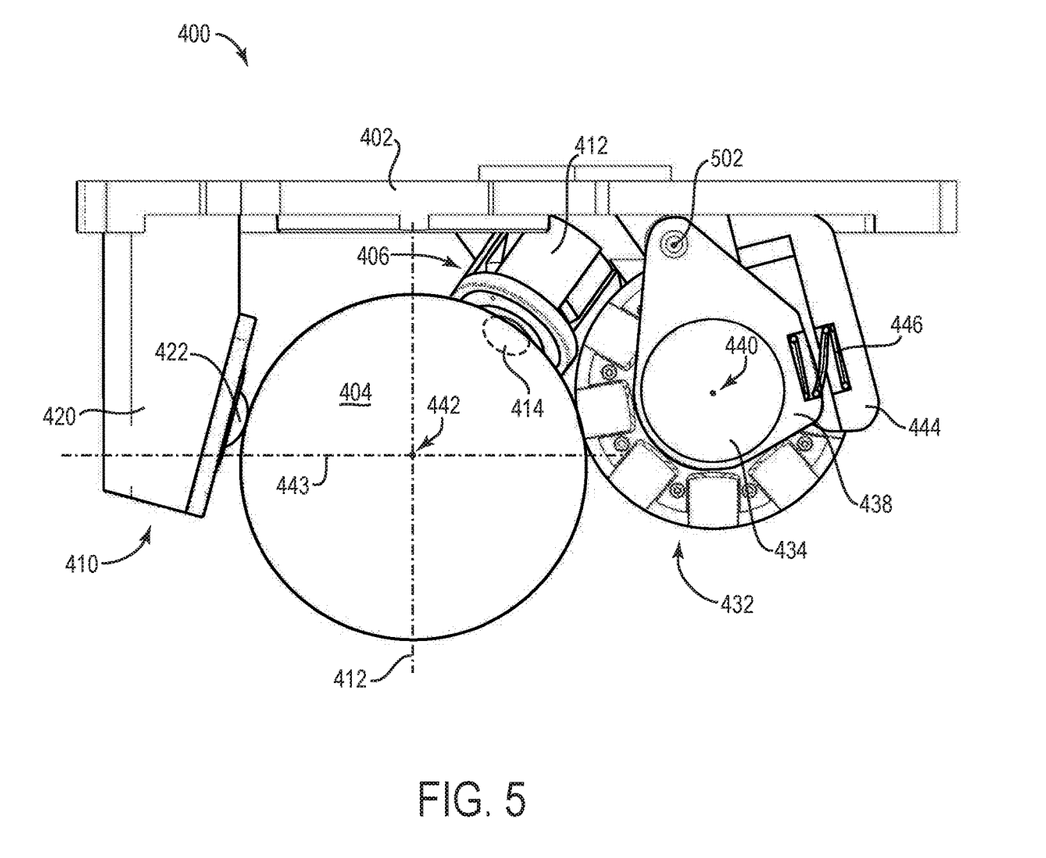
FIG. 5 is a cross-sectional side elevation view of the wheel module of FIG. 4, according to some implementations.

FIG. 5 is a cross-sectional side elevation view of the wheel module 400 of FIG. 4. In this example, the cross sectional view is at line 5-5 of FIG. 4, and ball transfer unit 408 is not shown.

Ball transfer unit 406 is shown with spherical ball 414 contacting spherical wheel 404. Ball transfer unit 406 is positioned such that spherical ball 414 contacts the spherical wheel above a ground-parallel plane that includes axis 443 and is parallel to ground surface 106 (and to base 402 in some implementations). Axis 443 extends through the center of spherical wheel 404 parallel to the ground 106. Thus, spherical ball 414 contacts spherical wheel 404 on the side of the ground-parallel plane of axis 443 nearest to base 402. For example, spherical ball 414 contacts spherical wheel 404 on a hemispherical portion of the wheel 404 that is on one side of the plane of axis 443 nearest to the base 402. Ball transfer unit 406 is positioned to transfer some of the vertical load carried by the rolling module 400 to the spherical wheel 404. In this example, ball transfer unit 406 is angled to contact the spherical wheel at a surface location that is approximately 45 degrees from the axis 443 toward the base 402. This position allows the ball transfer unit 406 to support a greater maximum load on the base 402 than at a lower contact position closer to axis 443 (e.g., a greater load force, including a greater horizontal component of the load force, is seen at a lower position, such as that of ball transfer unit 410, for a given load).

Ball transfer unit 410 is also shown with its spherical ball 422 contacting spherical wheel 404. Ball transfer unit 410 is positioned such that the spherical ball 422 contacts the spherical wheel 404 at a position on the surface of the wheel 404 that is above the ground parallel plane that includes axis 443, e.g., on the side of the axis 443 plane that is closer to the base 402. For example, this is the hemispherical portion of spherical wheel 404 that is on the side of the axis 443 plane that is nearest to base 402. Ball 422 contacts the spherical wheel at a position that is closer to the axis 443 than the contact position of the ball transfer unit 406, e.g., a "lower" position. Ball transfer unit 410 is located to place ball 422 at a lower position so that it more directly opposes the bias force (side load, e.g., preload force) applied by omni wheel 432 to spherical wheel 404 than it would at a contact position that is closer to base 402. The preload force applied by omni wheel 432 biases the spherical wheel 404 to move out of its rotating position, e.g., to become misaligned with one or more of the ball transfer units 406, 408, and 410. Ball 422 of ball transfer unit 410 thus is positioned closer to the plane of axis 443 than ball 414 of ball transfer unit 406, to oppose this force and assist maintaining the spherical wheel 404 in an aligned position within its rotating space.

In this example, ball transfer unit 408 (not shown in FIG. 5) is positioned similarly to ball transfer unit 406, e.g., such that the spherical ball 418 of the ball transfer unit 406 contacts the surface of the spherical wheel 404 closer to the base 402 than the ball 422 of the ball transfer unit 410. For example, the ball transfer unit 408 can be angled to contact the spherical wheel at a position that is approximately 45 degrees from the plane of axis 443 toward the base 402.

Omni wheel 432 contacts the spherical wheel 404 at one or more locations of the spherical wheel. In this example, the contact location(s) are above the ground-parallel plane of axis 443, e.g., on the side of the plane that is closer to base 402. Omni wheel 432 is rotatably coupled to pivoting member 438, which is rotatably coupled to support member 444 by a coupling such that the pivoting member 438 is rotatable about axis 502. Support member 444 is rigidly coupled to the base 402, such that pivoting member 438 can pivot with respect to the support member 444. Spring 446 can be positioned in compression between pivoting member 438 and support member 444 and provides a force on pivoting member 438 toward the spherical wheel 404. This constant force pushes the omni wheel 432 against the surface of the spherical wheel to provide a stronger grip and reduce slippage between omni wheel 432 and spherical wheel 404 when rotating the omni wheel with motor 434.

In some implementations, other configurations can be used. For example, the ball transfer units can be positioned at other positions, and/or additional or fewer ball transfer units can be used to contact the spherical wheel 404.

Figure 6:
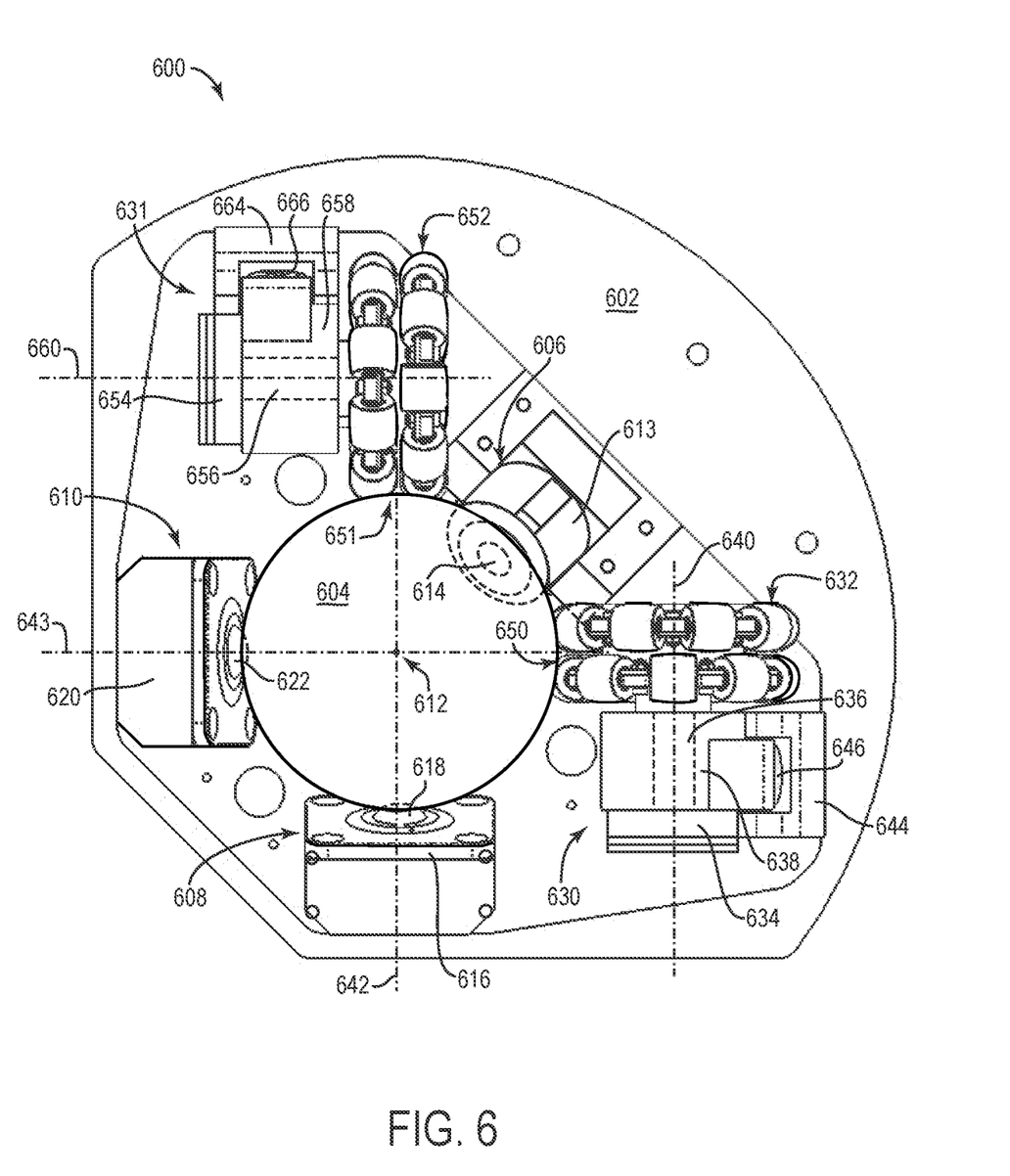
FIG. 6 is a is a bottom view of another example wheel module, according to some implementations.

FIG. 6 is a bottom view of another example wheel module 600, according to some implementations. For example, wheel module 600 can be one or more wheel modules 102 of FIGS. 1 and 2. Wheel module 600 includes two omni wheel drive mechanisms to drive rotation of a spherical wheel in two directions, in contrast to the single omni wheel drive mechanism provided in the wheel module 400 of FIGS. 4 and 5.

Wheel module 600 includes a base 602 (e.g., chassis), and a spherical wheel 604 is positioned in a space near to the base 602. These components can be the same or similar to corresponding components described above for FIG. 4.

Wheel module 600 includes rotary bearings provided between the base 602 and the spherical wheel 604. The rotary bearings constrain the spherical wheel 604 to roll within a rotating space defined by the rotary bearings and omni wheel, and provide a path for the weight of a load carried by base 602 directly to the spherical wheel 604, similarly as described for FIG. 4. In described implementations, the rotary bearings are ball transfer units 606, 608, and 610 that are directly coupled to base 602 and contact the surface of spherical wheel 604 above an axis 643 (on a side of axis 643 closer to the base 602), such that gravity forces the ball transfer units in contact with the surface of the spherical wheel 604.

Ball transfer unit 606 is similar to ball transfer unit 406 of FIG. 4, and includes a restraining fixture 613 and a spherical ball 614. Ball transfer unit 608 includes a restraining fixture 616 and a spherical ball 618, and ball transfer unit 610 includes a restraining fixture 620 and a spherical ball 622. Ball transfer units 608 and 610 are similar to ball transfer unit 410 of FIG. 4. Each spherical ball 614, 618, and 622 contacts the surface of the spherical wheel 604 and bears a portion of the load carried by the base 602. Each spherical ball 614, 618, and 620 can be rolled omni-directionally within its fixture with respect to the restraining fixture and the base 602.

In some implementations, ball transfer units 606, 608, and 610 are spaced around the spherical wheel 604 approximately equally about a vertical axis 612 extending through a center of the spherical wheel 604 perpendicular to a ground surface or a plane of the bottom surface of the base 602. In some implementations, one or more of the ball transfer units 606, 608, and 610 can be adjusted in its position to allow space for other components, e.g., drive mechanisms 630 (described below).

Ball transfer units 606, 608, and 610 can be positioned at different heights and/or angles with respect to the spherical wheel 604, e.g., such that their spherical balls contact the spherical wheel 604 at different distances from the base 602. In this example, ball transfer units 608 and 610 are positioned such that their spherical balls 618 and 622 contact the surface of the spherical wheel 604 at points further from the base 602 (and closer to a ground-parallel plane including axis 643) than the location at which spherical ball 614 of ball transfer unit 606 contacts the spherical wheel 604.

First drive mechanisms 630 and second drive mechanism 631 are coupled to the base 602. First drive mechanism 630 includes a first omni wheel 632 that is connected to a motor 634. In this example, the first omni wheel 632 contacts the surface of the spherical wheel 604 and is connected to a driven rotatable shaft 636 of the motor 634. Shaft 636 is rotatably coupled to a pivoting member 638 that is rotatably coupled to the base 602.

First omni wheel 632 contacts the spherical wheel 604 at a first contact position 650 as shown (or multiple locations at position 650, e.g., if two layers of circumferential rollers are used on the omni wheel as shown), and is similar to the omni wheel 432 described above with respect to FIGS. 4 and 5. First omni wheel 632 rotates about axis 640 that extends parallel to the surface of base 602 and/or to the ground surface. When first omni wheel 632 is driven about axis 640, it rotates spherical wheel 604 via first contact position 650 about an axis 642 extending through the center of the spherical wheel 604 and parallel to axis 640. This provides a movement component to the wheel module 600 along axis 643 that is perpendicular to the axes 640 and 642 and provides this movement to the chassis and load carried by the wheel drive system of which wheel module 600 is a part. When spherical wheel 604 is rotated in a different direction than about axis 642, e.g., by second drive mechanism 631, the freely-rotating circumferential rollers of the first omni wheel 632 permit this movement of the spherical wheel 604 with respect to the first omni wheel 632.

First omni wheel 632 can be biased against the surface of spherical wheel 604 by a spring force or other type of force. In this example implementation, pivoting member 638 that supports first omni wheel 632 is rotatably coupled to a support member 644 that is rigidly coupled to base 602. A spring 646 is coupled between the support member 644 and the pivoting member 638 and is in compression to provide a spring bias of the first omni wheel 632 against the surface of the spherical wheel 604, similarly as described above for omni wheel 432.

Second drive mechanism 631 includes a second omni wheel 652 that is connected to a second motor 654. In this example, the second omni wheel 652 contacts the surface of the spherical wheel 604 and is connected to a driven rotatable shaft 656 connected to the rotating shaft of the motor 654. The shaft 656 is supported by a pivoting member 658 that is coupled to the base 602. The second omni wheel 652 contacts the spherical wheel 604 at a second contact position 651 as shown. In this example, second contact position 651 is positioned at 90 degrees about the vertical axis 612 from the first contact position 650 of the first omni wheel 632.

Second omni wheel 652 rotates about axis 660 that is positioned parallel to the surface of base 602. When second omni wheel 652 is driven about axis 660, it transfers force via second contact position 651 and rotates spherical wheel 604 about axis 643 extending through the center of the spherical wheel 604 that is perpendicular to axis 642. This provides a movement component to the wheel module 600 and carried load along axis 642 perpendicular to the axis 643. When the wheel module 600 is driven in a different direction than along axis 643, freely-rotating circumferential rollers of the second omni wheel 652 permit this movement of the spherical wheel 604 with respect to the second omni wheel 652.

Second omni wheel 652 can be biased against the surface of spherical wheel 604 by a spring force or other type of force. In this example implementation, pivoting member 658 that supports the second omni wheel 652 is rotatably coupled to a support member 664. A spring 666 is coupled between the support member 664 and the pivoting member 658 to provide a spring bias of the second omni wheel 652 against the surface of the spherical wheel 604, similarly as for first omni wheel 632.

Figure 7:
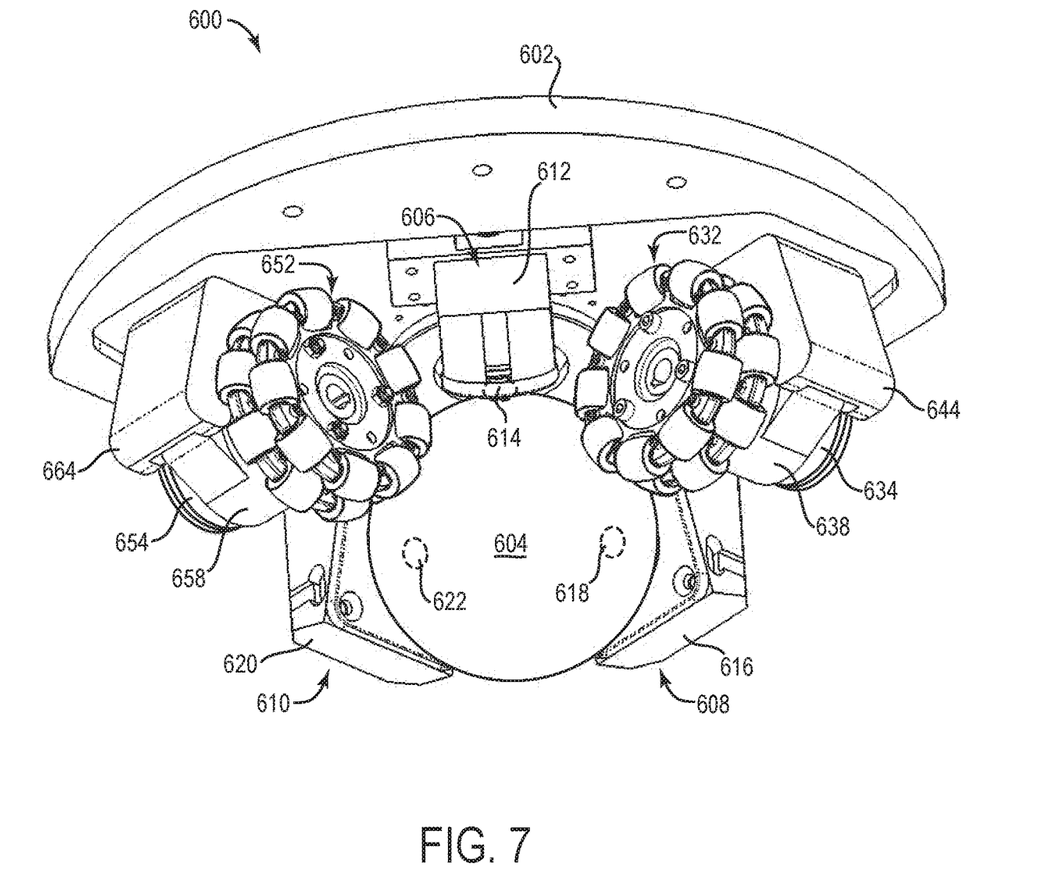
FIG. 7 is a perspective view of the wheel module of FIG. 6, according to some implementations.

FIG. 7 is a perspective view of the wheel module 600 of FIG. 6. In this example, drive mechanism 631 including second omni wheel 652 are included in the module 600. Ball transfer unit 606 is positioned similarly to ball transfer unit 414 of FIGS. 4 and 5, such that the spherical ball 614 of the ball transfer unit 606 contacts the surface of the spherical wheel 604 at a contact position that is axis 643 of the spherical wheel 604. For example, the contact position can be approximately 45 degrees toward the base 602 from a plane that includes axis 643 and that is parallel to the ground surface. Spherical ball 622 of ball transfer unit 610 contacts spherical wheel 604 at a contact position above the ground-parallel plane that includes axis 643. The contact position of ball transfer unit 610 is further from base 602 than the contact position of ball transfer unit 606, e.g., the contact position of spherical ball 614 is closer to base 602 than the contact position of spherical ball 622.

The position of ball transfer unit 606 allows it to transfer more of the vertical load carried by the rolling module 600 to the spherical wheel 604 than ball transfer unit 610. Ball transfer unit 610 is positioned lower than ball transfer unit 606 so that it more directly opposes a force (side load, e.g., preload force) applied by first omni wheel 632 to spherical wheel 604 than it would if opposing the force at a contact position closer to base 602. This helps maintain the spherical wheel 604 in an aligned position within its rolling space contacted by the ball transfer units.

Ball transfer unit 608 is positioned similarly to ball transfer unit 610, e.g., such that the spherical ball 618 of the ball transfer unit 610 contacts the surface of the spherical wheel 604 further from the base 602, and closer to the ground-parallel plane of axis 643, than the ball 614 of the ball transfer unit 606. For example, the ball transfer unit 608 can be positioned at the same angle and distance from the base 602 as the ball transfer unit 610. Ball transfer unit 608 is positioned lower than ball transfer unit 606 so that it more directly opposes a force (side load) applied by second omni wheel 652 to spherical wheel 604 than it would at a contact position closer to base 602. This helps maintain the spherical wheel 604 in an aligned position within its rolling space contacted by the ball transfer units.

First omni wheel 632 contacts the spherical wheel 604 at one or more locations 650 of the spherical wheel. First omni wheel 632 is rotatably coupled to pivoting member 638, which is rotatably coupled to support member 644 by a coupling such that the pivoting member 638 is rotatable about an axis parallel to axis 640 (e.g., similar to axis 502 of FIG. 5). Support member 644 is rigidly coupled to the base 602, such that pivoting member 638 can pivot with respect to the support member 644. A spring can be positioned in compression between pivoting member 638 and support member 644 and provides a force on pivoting member 638 toward the spherical wheel 604, e.g., similarly as spring 446 of FIGS. 4 and 5. This constant force pushes the first omni wheel 632 against the surface of spherical wheel 604 to provide a strong grip and reduce slippage between first omni wheel 632 and spherical wheel 604 when rotating the first omni wheel with motor 634.

Second omni wheel 652 is configured and operates similarly to the first omni wheel 632, to contact the spherical wheel 604 at a contact position 653 about 90 degrees from the contact position of the first omni wheel 632 about the vertical axis 612 of the spherical wheel 604, using a preload force provided by spring 666 that is provided in compression between pivoting member 658 and support member 664, similarly as described above for omni wheel 632.

In some implementations, other configurations can be used. For example, the first omni wheel 632 and second omni wheel 652 can be spaced from each other at different positions or angles about axis 612 than shown in FIG. 7. Ball transfer units 606, 608, and 610 can be positioned at different distances to the base 602 and at different spacings from each other around axis 612.

In some implementations, one or more brake mechanisms can be included in the wheel drive system 100. For example, brake pads can be applied to the spherical wheel to apply friction to the spherical wheel and slow or stop the wheel from rolling. In some implementations, a brake ring can be positioned below the wheel and moved toward the base to contact the spherical wheel and apply friction, as described in greater detail in copending U.S. patent application Ser. No. 16/191,267, entitled "Brake Mechanism for Spherical Wheel," filed concurrently herewith, and which is incorporated herein by reference.

Figure 8:
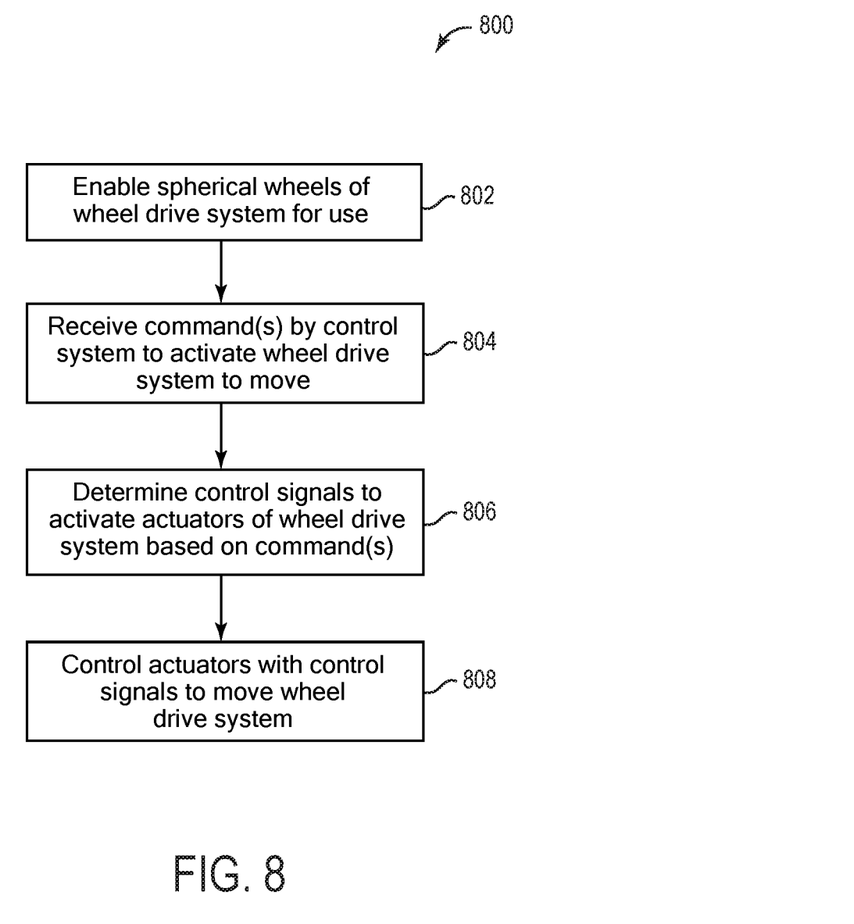
FIG. 8 is a flow diagram illustrating an example method to control a wheeled apparatus using spherical wheel mechanisms, according to some implementations.

FIG. 8 is a flow diagram illustrating an example method 800 to control a wheeled apparatus using spherical wheel mechanisms, according to some implementations. Method 800 can, for example, be used with any of the implementations of the wheel drive system 100 as described herein.

In block 802, a one or more spherical wheels of a wheel drive system are provided and/or enabled for use. For example, as described above, the wheel drive system can be provided to move a chassis that may be or carry a load object. In some examples, the chassis can be a component or device of a medical system that performs a medical procedure. For example, the chassis can be part of a teleoperated surgical device that includes one or more surgical instruments that operate on a patient that is located next to the surgical device.

The wheel drive system can include one or more wheel modules as described above with respect to FIG. 1. For example, each such wheel module constrains a spherical wheel to a rotating space relative to a base using one or more rotary bearings, and biases an omni wheel against the spherical wheel to rotate the spherical wheel within the rotating space by rotating the omni wheel with an actuator, as described herein.

In block 804, one or more commands are received by a control system of the wheel drive system to activate the wheel drive system to move, e.g., control system 120 as described above with respect to FIG. 1. In some examples, the commands can be received from a user that inputs the commands via a user interface and/or input device (e.g., touchscreen, keyboard, pointing device, etc.). The control system can include one or more processors (e.g., microprocessors or other processing circuits) that receive the commands and determine control signals for the wheel drive system.

In block 806, the control signals to activate one or more actuators of the wheel drive system are determined based on the received commands. The control signals are provided to actuators to generate a movement vector from each driven wheel module. In some implementations, one motor is included for each wheel module/spherical wheel, and at least two motors of different wheel modules are controlled to provide movement vectors that are summed to determine the desired resulting direction of movement of the wheel system. In some implementations, two motors are included in each wheel module that can provide rotation of the spherical wheel in two directions, and the resulting direction of movement can be determined by summing the movement vector provided by each controlled motor of the wheel module.

In block 808, actuators of the wheel drive system are controlled with the control signals determined in block 806 to output forces on the spherical wheels to move the wheel drive system and its load. For example, control signals can be output to all of the wheel modules of the wheel drive system, or output to a subset of the wheel modules. The driven directions of the wheel modules combine into a resulting movement vector that has a magnitude and direction resulting from the sum of the individual movement vectors provided by the motors.

In some implementations, the control system can receive sensor signals and status signals indicating proximity of other objects to the wheel drive system (e.g., in the path of movement), status of components of the wheel drive system (e.g., blockage of spherical wheels, omni wheels, etc.). The control system can adjust the actuator control signals in response to such sensor and status signals.

The blocks and operations described in the methods disclosed herein can be performed in a different order than shown and/or simultaneously (partially or completely) with other blocks and operations, where appropriate. Not all of the described blocks and operations need be performed in various implementations. In some implementations, blocks and operations can be performed multiple times, in a different order, and/or at different times in the methods.

The functional blocks, operations, features, methods, devices, and systems described in the present disclosure may be integrated or divided into different combinations of systems, devices, and functional blocks as would be known to those skilled in the art.

This description and the accompanying drawings that illustrate features and implementations should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure described features.

Further, this description's terminology is not intended to limit the scope of the claims. For example, spatially relative terms—such as "beneath", "below", "lower", "above", "upper", "proximal", "distal", and the like—may be used to describe one element's or feature's relationship to another element or feature as illustrated in the figures. These spatially relative terms are intended to encompass different positions (i.e., locations) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly. Likewise, descriptions of movement along and around various axes includes various special device positions and orientations. In addition, the singular forms "a", "an", and "the" are intended to include the plural forms as well, unless the context indicates otherwise. Components described as coupled may be electrically or mechanically directly coupled, or they may be indirectly coupled via one or more intermediate components.

Elements described in detail with reference to one implementation may, whenever practical, be included in other implementations in which they are not specifically shown or described unless the one or more elements would make an implementation non-functional or provide conflicting functions. For example, if an element is described in detail with reference to one embodiment and is not described with reference to a second embodiment, the element may nevertheless be included in the second embodiment.

Although the present implementations have been described in accordance with the examples shown, one of ordinary skill in the art will readily recognize that there can be variations to the implementations and those variations would be within the scope of the present disclosure. Accordingly, many modifications may be made by one of ordinary skill in the art without departing from the scope of the appended claims.

What is claimed is:

1. A wheel mechanism comprising:
a spherical wheel configured to contact a ground surface;
a base;
a rotary bearing coupled to the base and contacting a surface of the spherical wheel at locations of the spherical wheel on a first side of a plane that extends parallel to the ground surface through a center of the spherical wheel, the ground surface being on a second side of the plane opposite to the first side of the plane, wherein the rotary bearing is configured to provide a path for a portion of weight of a load carried by the wheel mechanism directly to the spherical wheel;
an omni wheel coupled to the base, the omni wheel being rotatable about an axis of the omni wheel and engaged with the surface of the spherical wheel; and
an actuator coupled to the base and to the omni wheel, the actuator configured to rotate the omni wheel to cause rotation of the spherical wheel;
a spring element coupled between the omni wheel and the base, the spring element providing a force on the omni wheel that biases the omni wheel against the surface of the spherical wheel, the spring element configured to isolate vibrations caused by rotation of the omni wheel against the surface of the spherical wheel.

2. The wheel mechanism of claim 1 wherein:
the rotary bearing is configured to allow the spherical wheel to rotate, and
the rotary bearing includes a ball transfer unit including a spherical ball contacting the surface of the spherical wheel.

3. The wheel mechanism of claim 1 wherein:
the omni wheel includes a plurality of rollers arranged around a circumference of the omni wheel, one or more of the plurality of rollers engaged with the surface of the spherical wheel, each roller of the plurality of rollers rotating about a respective axis of rotation that is tangential to the circumference of the omni wheel, and
the vibrations are caused by surfaces of the plurality of rollers rotating against the surface of the spherical wheel.

4. The wheel mechanism of claim 1 wherein:
the rotary bearing is one of a plurality of rotary bearings, and
the plurality of rotary bearings are coupled to the base and contact the surface of the spherical wheel at respective locations of the spherical wheel above the plane that is parallel to the ground surface.

5. The wheel mechanism of claim 4 wherein the plurality of rotary bearings are each configured to provide a path for a respective portion of the weight of the load carried by the wheel mechanism directly to the spherical wheel.

6. The wheel mechanism of claim 4 wherein the rotary bearings are spaced approximately equally around the spherical wheel.

7. The wheel mechanism of claim 4 wherein:
a first rotary bearing of the plurality of rotary bearings contacts the surface of the spherical wheel at a first position to oppose a force applied by the omni wheel against the spherical wheel,
a second rotary bearing of the plurality of rotary bearings contacts the surface of the spherical wheel at a second position closer to the base than the first position at which the first rotary bearing contacts the surface of the spherical wheel, and
the second rotary bearing transfers a greater force of the load to the spherical wheel than the first rotary bearing.

8. The wheel mechanism of claim 4 wherein:
the omni wheel is one of a plurality of omni wheels coupled to the base and engaged with the surface of the spherical wheel at respective locations of the spherical wheel on the first side of the plane, and
each rotary bearing of the plurality of rotary bearings engages the spherical wheel in a respective position to oppose a respective force applied by a particular omni wheel of the plurality of omni wheels against the surface of the spherical wheel.

9. The wheel mechanism of claim 8 wherein:
each of the omni wheels is rotatably coupled to a respective pivoting member,
each respective pivoting member is rotatably coupled to the base, and
the spring element is one of a plurality of spring elements, each spring element being coupled between each respective pivoting member and the base that biases the respective omni wheel against the surface of the spherical wheel.

10. The wheel mechanism of claim 1 wherein:
the omni wheel is rotatably coupled to a pivoting member,
the pivoting member is rotatably coupled to the base, and
the spring element is coupled between the pivoting member and the base.

11. A wheel system comprising:
a chassis; and
a plurality of wheel modules coupled to the chassis, wherein one or more wheel modules of the plurality of wheel modules includes:
a spherical wheel configured to contact a ground surface;
a base coupled to the spherical wheel via a rotary bearing that contacts a surface of the spherical wheel at locations of the spherical wheel above a plane that extends parallel to the ground surface through a center of the spherical wheel, wherein the rotary bearing is configured to provide a path for a portion of weight of a load carried by the wheel system directly to the spherical wheel;
an omni wheel coupled to the base, the omni wheel being rotatable about an axis of the omni wheel and engaged with the surface of the spherical wheel; and
an actuator coupled to the base and to the omni wheel and configured to apply rotational force to the omni wheel to cause rotation of the spherical wheel,
a spring element coupled between the omni wheel and the base, the spring element providing a force on the omni wheel that biases the omni wheel against the surface of the spherical wheel, the spring element configured to isolate vibrations caused by rotation of the omni wheel against the surface of the spherical wheel.

12. The wheel system of claim 11 wherein the plurality of wheel modules are three wheel modules.

13. The wheel system of claim 11 wherein:
the one or more wheel modules are multiple wheel modules,
the wheel system includes a respective actuator associated with each of the multiple wheel modules, and
each of the respective actuators is configured to rotate an associated spherical wheel in a different direction with respect to other wheel modules of the multiple wheel modules.

14. The wheel system of claim 11 wherein:
in each of the one or more wheel modules, the rotary bearing is one of a plurality of ball transfer units that each transmit a respective portion of the weight of the load carried by the wheeled system directly to the spherical wheel,
the plurality of ball transfer units are coupled to the base and contact the surface of the spherical wheel at respective locations of the spherical wheel above the plane, and wherein
the plurality of ball transfer units are configured to allow the spherical wheel to rotate.

15. The wheel system of claim 11 wherein, in each of the one or more wheel modules:
the rotary bearing is a first rotary bearing that contacts the surface of the spherical wheel at a first position to oppose a force applied by the omni wheel against the spherical wheel,
a second rotary bearing contacts the surface of the spherical wheel at a second position closer to the base than the first position at which the first rotary bearing contacts the surface of the spherical wheel, and
the second rotary bearing transfers a greater force of the load to the spherical wheel than the first rotary bearing.

16. The wheel system of claim 15, wherein:
the omni wheel engages the surface of the spherical wheel above the plane,
the omni wheel includes a plurality of rollers arranged around a circumference of the omni wheel, one or more of the plurality of rollers engaged with the surface of the spherical wheel, each roller of the plurality of rollers rotating about a respective axis of rotation that is tangential to the circumference of the omni wheel, and
wherein the vibrations are caused by surfaces of the plurality of rollers rotating against the surface of the spherical wheel.

17. The wheel system of claim 15 wherein:
in each of the one or more wheel modules, the omni wheel is one of a plurality of omni wheels coupled to the base and engaged with the surface of the spherical wheel, and
the first and second rotary bearings each engages the spherical wheel in a respective position to oppose a respective force applied by a particular omni wheel of the plurality of omni wheels against the surface of the spherical wheel.

18. A method to control a wheel mechanism, the method comprising:

constraining a spherical wheel in a rotating space relative to a base, the spherical wheel contacting a ground surface, wherein:

the spherical wheel is constrained by a plurality of rotary bearings that are coupled to the base and engaged with a surface of the spherical wheel at locations of the spherical wheel on a first side of a plane that extends parallel to the ground surface through a center of the spherical wheel, the ground surface being on a second side of the plane opposite to the first side of the plane, and the rotary bearings allow the spherical wheel to rotate in all directions and provide a path for a portion of weight of a load carried by the wheel mechanism directly to the spherical wheel;

biasing an omni wheel against the spherical wheel with a spring force provided between the omni wheel and the base by a spring element, wherein the omni wheel is coupled to the base and is rotatable about an axis of the omni wheel; and controlling an actuator to rotate the omni wheel, wherein the rotation of the omni wheel causes the spherical wheel to rotate within the rotating space, wherein the spring element isolates vibrations caused by the rotation of the omni wheel against the surface of the spherical wheel.

19. The method of claim 18, wherein:

the wheel mechanism includes a plurality of wheel modules, the spherical wheel and the actuator are a first spherical wheel and a first actuator included in a first wheel module of the plurality of wheel modules, a second spherical wheel and a second actuator are included in a second wheel module of the plurality of wheel modules, the method further comprises controlling the second actuator to rotate a second omni wheel coupled to the base and engaged with the surface of the second spherical wheel, and the rotation of the second omni wheel causes the second spherical wheel to rotate in a second direction different than a first direction in which the first spherical wheel is caused to rotate by controlling the first actuator.

20. The method of claim 18, wherein:

the omni wheel includes a plurality of rollers arranged around a circumference of the omni wheel, one or more of the plurality of rollers engaged with the surface of the spherical wheel, each roller of the plurality of rollers rotating about a respective axis of rotation that is tangential to the circumference of the omni wheel, and the vibrations are caused by surfaces of the plurality of rollers rotating against the surface of the spherical wheel.

* * * * *